United States Patent Office 3,347,944
Patented Oct. 17, 1967

3,347,944
PRODUCTION OF ALKYLIDENEBI-
CYCLOHEPTENES
Henry E. Fritz, Charleston, Kenneth E. Atkins, South
Charleston, and George L. O'Connor, Charleston,
W. Va., assignors to Union Carbide Corporation, a corporation of New York
No Drawing. Filed May 16, 1966, Ser. No. 550,120
14 Claims. (Cl. 260—666)

This application is a continuation-in-part of our copending application Ser. No. 492,297, filed October 1, 1965, now abandoned.

This invention is concerned with a novel process for the production of 5-alkyldienebicyclo[2.2.1]hept - 2 - enes. More particularly, this invention relates to the production of a 5-alkylidenebicyclo[2.2.1]hept-2-ene by the base-catalyzed isomerization of a 5-alkenylbicyclo[2.2.1]hept-2-ene.

It is known that non-conjugated diolefins whose double bonds are of unequal reactivities are useful as the termonomer in the so-called ethylene-propylene-termonomer (EPT) rubbers. This unequal reactivity is necessary to permit the diolefin to enter the EPT terpolymer via reaction of the more-reactive double bond, while leaving the less-reactive double bond essentially intact to provide the residual unsaturation necessary for vulcanization. Because vinyl double bonds and bicycloheptene double bonds are highly reactive, considerable effort has been expended in evaluating diolefins containing these structures, especially derivatives of bicycloheptene. See, for example, U.S. Patents 3,000,866, 3,063,973, 3,093,620, 3,093,621, 3,151,173, and British Patent 880,904. One of the most promising structures yet developed is the 5-alkylidene-bicyclo[2.2.1]hept-2-ene structure of the general formula:

(I)

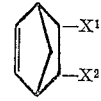=R wherein R is a divalent alkylidene radical of at least two carbon atoms. To date, however, no economically attractive process has been reported which is capable of producing these interesting compounds. For example, J. L. Nyce, in U.S. Patent 3,151,173, reports that 5-alkylidenebicyclo [2.2.1]-hept-2-enes can be prepared by an acid-catalyzed isomerization of 2 - alkylbicyclo[2.2.1]hepta-2,5-dienes. This reported process suffers from two economic disadvantages. First, the alkylbicycloheptadiene is prepared from cyclopentadiene and an α-acetylene, but the latter compound is expensive and not generally commercially available in large quantities.

Secondly, the acid-catalyzed isomerization suffers from relatively poor efficiencies and yields because the acid catalysts tend to promote the polymerization of the highly reactive bicycloheptene structure. This polymerization can be minimized only by operating at low conversions. Since the starting and product isomers have similar boiling points, they are not readily separated by a simple fractionation, thereby yielding a relatively impure product which is undesirable for use in an EPT rubber.

It has now been discovered by this invention that 5-alkylidenebicyclo[2.2.1]hept-2-enes can be produced in high purity and yields at high conversions from the more readily available 5-alkenylbicycloheptenes, which are prepared from cyclopentadiene and aliphatic dienes. In general, then, the process of this invention comprises contacting a 5-alkenylbicyclo[2.2.1]hept-2-ene, as hereinafter defined, with a base catalyst, as hereinafter defined, under conditions serving to promote the isomerization for a period of time sufficient to produce the alkylidenebicycloheptene.

The 5-alkenylbicycloheptenes which are isomerized in accordance with the process of this invention are represented by the general formula:

(II)

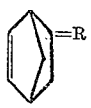

wherein $X^1$ is alkenyl of from 2 to 10 carbons and free from branching between the double bond and the bicycloheptene ring; and $X^2$ is hydrogen or alkyl of from 1 to 10 carbons. Preferred compounds are those wherein $X^1$ is 1-alkenyl, i.e., the double bond is attached to the carbon atom bonded to the bicycloheptene nucleus, and $X^2$ is hydrogen. Illustrative compounds include 5-vinylbicyclo[2.2.1]hept-2-ene,
5-propenylbicyclo[2.2.1]hept-2-ene,
5-butenylbicyclo[2.2.1]hept-2-ene,
5-decenylbicyclo[2.2.1]hept-2-ene,
5-vinyl-6-methylbicyclo[2.2.1]hept-2-ene,
5-vinyl-6-ethylbicyclo[2.2.1]hept-2-ene,
and the like.

These compounds are all readily prepared by the well-known Diels-Alder reaction of cyclopentadiene, charged as such or as its dimer, with a diene of the formula $X^1$—CH=CH—$X^2$ wherein $X^1$ and $X^2$ are as defined above. Dienes of this type, such as butadiene, pentadiene, and the like are generally more readily available than the corresponding acetylenic isomers which are employed to prepare the 2-alkylbicyclo[2.2.1]hepta-2,5-diene precursors employed in U.S. 3,151,173.

Without wishing to limit this invention to any particular theory, it is believed that the reaction proceeds by the mechanism set forth below, employing the isomerization of 5-vinylbicyclo[2.2.1]hept-2-ene to 5-ethylidenebicyclo [2.2.1]hept-2-ene as an illustration.

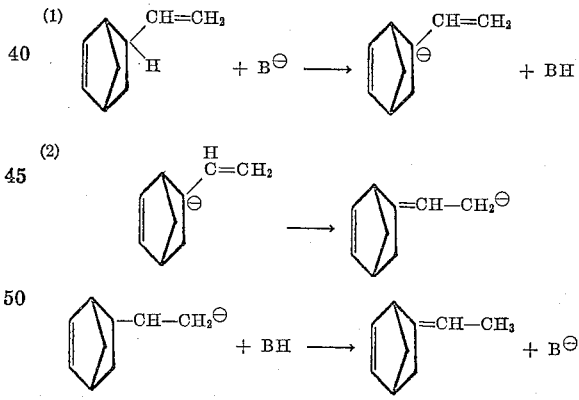

That is, the isomerization proceeds by (1) the reaction of base anion (B⊖) and alkenylbicycloheptene to form a tertiary carbanion, which (2) rearranges to form the more stable primary carbanion, which (3) reacts with the base (BH) to form alkylidenebicycloheptene. Because of the difficulty in forming the tertiary carbanion, a strong base is necessary to effect step (1) of the foregoing scheme. It has been reported, however, that the use of strong bases for the isomerization of alkenylcyclohexenes frequently results in dehydrogenation of the alkenylcyclohexene, or that if isomerization does occur the alkenyl double bond migrates to the cyclohexenyl ring to form an alkylcyclohexadiene. For example, O'Grady et al., at the Symposium on Carbanion Reactions and Processes of Hydrocarbons, Division of Petroleum Chemistry, American Chemical Society, Sept. 13–18, 1959, disclosed that high-surface sodium promotes the conversion of 4-vinylcyclohexene to ethylbenzene and the conversion of dipentene (1-methyl- 4-isopropenylcyclohexane) to p-cymene (1-methyl-4-isopropylbenzene) or a mixture of α-terpinene (1-methyl-4-isopropyl-1,3-cyclohexadiene) and terpinolene (1-methyl-4-isopropylidenecyclohexene). Similar results were reported by Reggel et al. in J. Org. Chem 23, 1136–39 (1958) employing N-lithioethylenediamine as a catalyst. N-sodioethylenediamine, on the other hand, was reported to be inactive. Therefore, it was clearly unexpected that these catalysts and other highly basic reaction systems could be employed to promote the isomerization of alkenylbicycloheptenes to alkylidenebicycloheptenes without the formation of alkylbicycloheptadienes or their dehydrogenation products.

The reaction systems which are employed in accordance with this invention are those containing an alkali metal in a catalytically-active form. Preferred alkali metals are those having an atomic number of from 3 to 19, inclusive (lithium, sodium and potassium). In general, the catalytically-active alkali metal falls into one of three systems: (1) the high-surface alkali metal system, (2) the strong base/dipolar, aprotic cationic solvating agent system, and (3) the alkali metal amide/nitrogen base system.

The high-surface alkali metal system comprises a composition comprising an alkali metal deposited on a support having a surface area of at least about 30 square meters per gram, such as alumina, silica gel, aluminosilicates, activated carbon and the like. Support materials having surface areas of less than about 30 square meters per gram, such as fused alumina, sand, sodium chloride and the like do not provide an active catalyst. The maximum surface area is not critical, and can be as high as 1,000 square meters per gram or even higher. Alumina is the preferred support.

The high-surface alkali metal is readily prepared by admixing the alkali metal and support at a temperature above the melting point of the alkali metal and allowing the molten metal to become evenly distributed over the surface of the support. The resulting composition is then cooled to solidify the alkali metal. The ratio of alkali metal to support in the catalyst composition is not highly critical to this invention, and can vary from about 1 or less to about 20 or more weight percent, based upon the weight of support.

The second catalyst system of this invention comprises a solution of a strong base in a dipolar, aprotic cationic solvating agent.

The strong bases which are employed in accordance with this aspect of the invention are bases which essentially completely ionize in water, i.e., the alkali metal hydroxides, as well as compounds which are destroyed in water to form strong bases, such as alkali metal alkoxides or aryloxides and alkali metal amides. Preferred bases are illustrated by the formula:

(III)           MZ wherein M is an alkali metal having an atomic number of from 3 to 19, inclusive, and Z is an amino group, a hydroxyl group or a hydrocarbyloxy group free from non-benzenoid unsaturation and containing from 1 to about 10 carbons, such as methoxy, ethoxy, propoxy, isopropoxy, butoxy, sec-butoxy, tert-butoxy, 2-ethylhexoxy, decoxy, phenoxy, naphthoxy, benzoxy, phenethoxy, tolyloxy, xylyloxy, and the like.

The reaction medium which is employed in this second aspect of the process of this invention is an organic dipolar aprotic cationic solvating agent which is liquid under the reaction conditions. Dipolar aprotic solvents are well known to be compounds having a high dielectric constant (greater than about 15) and high dipole moment (greater than about 2.0 Debye units) but without suitably labile hydrogen atoms to form strong hydrogen bonds with appropriate species. (See Parker, "The Effects of Solvation on the Properties of Anions in Dipolar Aprotic Solvents," Quart. Revs., 16, 163–87 (1962) at pp. 163, 4.) Common dipolar aprotic solvents include dimethyl formamide, dimethylacetamide, dimethyl sulfoxide, sulfolane (tetrahydrothiophene-1,1-dioxide), acetone, acetonitrile, nitrobenzene and the like. Not all dipolar aprotic solvents are suitable for this invention, however, because many lack sufficient cationic solvating power. Thus, only dipolar aprotic solvents having a negative charge localized on a bare oxygen atom, such as dimethylsulfoxide, dimethylformamide, sulfur dioxide, dimethylacetamide, 2-pyridones, 2-pyrrolidones, pyridine N-oxide, phosphorus oxides and substituted tertiary amides can be employed in this invention. Dipolar aprotic solvents wherein the negative portion of the solvent dipole is dispersed, is on an unfavorable electron-donor atom or is surrounded by bulky groups, such as nitroalkanes and the like, are unsuitable.

A preferred class of dipolar aprotic cationic solvating agents is represented by the formula:

(IV) 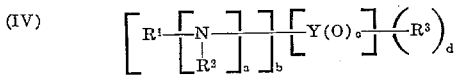

wherein Y is carbon, phosphorus or sulfur; $a$ is an integer having a value of from 0 to 1, and is 1 only when Y is carbon or phosphorus; $b$ is an integer having a value of 1 or 3, and is 1 only when Y is carbon or sulfur and is 3 only when Y is phosphorus; $c$ is an integer having a value of 1; $d$ is an integer having a value of from 0 to 1, and is 0 only when Y is phosphorus and is 1 only when Y is carbon or sulfur; each $R^1$ and $R^2$, when taken alone, is a hydrocarbyl radical free from non-benzenoid unsaturation containing up to about 10 carbons; $R^3$, when taken alone, is hydrogen or a hydrocarbyl radical free from non-benzenoid unsaturation containing up to about 10 carbons, and is hydrocarbyl when Y is sulfur; $R^1$ and $R^2$, when taken together, form an alkanediyl radical of from about 2 to about 10 carbons which, when taken with >N—, forms a heterocyclic ring of from 3 to 6 ring members; and $R^1$ and $R^3$, when Y is carbon or sulfur and, when taken together, form an alkanediyl radical of from about 3 to 10 carbons which, when taken with

—NY(O)— forms a heterocyclic ring of from 5 to 6 ring members.

By the phrase "hydrocarbyl radical-free from non-benzenoid unsaturation" is meant a monovalent hydrocarbon group consisting solely of saturated or aromatic moieties, such as alkyl, cycloalkyl, aryl, alkaryl, aralkyl and the like. By the term "alkanediyl radical" is meant a divalent saturated hydrocarbon radical.

Subgeneric to the compounds of Formula IV are the sulfoxides of the formula:

(V)          $R^1$—SO—$R^3$ the carboxamides of the formula:

(VI) 

and the phosphoric triamides of the formula:

(VII) 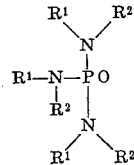

wherein $R^1$, $R^2$ and $R^3$ are as defined above.

Illustrative examples of these compounds include dimethylsulfoxide, diethylsulfoxide, diphenylsulfoxide, tetrahydrothiophene 1-oxide, N,N-dimethylformamide, N,N-dimethylacetamide, N-methylpyrrolidone, 1-(acetyl) piperidine, hexamethylphosphoric triamide, hexaethylphosphoric triamide, hexabutylphosphoric triamide, N,N-diethyl - N',N',N'',N'' - tetramethylphosphoric triamide, N,N - dimethyl-N',N'- N'',N''- tetraphenylphosphoric triamide, N,N,N',N'-tetramethyl-N'',N''-diphenylphosphoric triamide, N,N',N''-trimethyl-N,N',N''-triphenylphosphoric triamide, N,N'-diethylene-N'',N''-dimethylphosphoric triamide, N,N',N''-triethylenephosphoric triamide, N,N', N''-tris(tetramethylene)phosphoric triamide and the like. Preferred compounds are those wherein each $R^1$, $R^2$ and $R^3$, when taken individually, has no more than one carbon, and each of $R^1$ and $R^2$, when taken together, and $R^1$ and $R^3$, when taken together, form a polymethylene chain of from 3 to 5 carbons.

The molar ratio of dipolar aprotic cationic solvating agent to strong base is not narrowly critical, but ordinarily should be in the range of from about 2:1 to about 30:1 or higher. Molar ratios of from about 5:1 to about 10:1 are preferred.

The final base-catalyst system comprises a solution of (1) an alkali metal amide in (2) a nitrogen base preferably containing at least one hydrogen bonded to nitrogen and which is liquid at the reaction conditions. In general, suitable alkali metal amides are derivatives of suitable nitrogen bases which are obtained by the substitution of a hydrogen bonded to nitrogen by an alkali metal.

The nitrogen bases employed in accordance with this invention consist of at least nitrogen and hydrogen, contain no atoms other than nitrogen, hydrogen and carbon and preferably have at least one hydrogen bonded to a nitrogen atom, and include ammonia, hydrazine, and primary and secondary organic monoamines, as well as organic polyamines containing at least 1 primary or secondary amino group. A preferred class of nitrogen bases is represented by the formula:

(VIII)

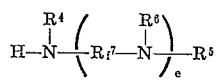

wherein each of $R^4$, $R^5$ and $R^6$, when taken separately, is hydrogen or hydrocarbyl free from non-benzenoid unsaturation of up to about 20 carbons, preferably up to about 10 carbons; $R^7$ is a divalent hydrocarbyl radical free from non-benzenoid unsaturation and containing from 2 to about 10, preferably from 2 to 3 carbons; $e$ is an integer having a value of from 0 to about 10, preferably from 0 to about 5; and $f$ is an integer having a value of from 0 to 1, and is 1 when $e$ has a value of greater than 1. Suitable nitrogen bases include ammonia, methylamine, ethylamine, butylamine, 2-ethylhexylamine, decylamine, eicosylamine, benzylamine, dimethylamine, dibutylamine, didecylamine, methylbutylamine, ethylenediamine, propylenediamine, diethylenetriamine triethylenetetramine, aniline, hydrazine, methylhydrazine, N,N-dimethylhydrazine, N,N'-dimethylhydrazine and the like. When $R^4$ and $R^5$ are taken together, nitrogen bases such as pyridine methylpyridine, ethylpyridine, pyridazine, pyrimidine, pyrazine, pyrrollidine, piperidine, and the like are illustrative of suitable bases.

As indicated above, the alkali metal amides are the alkali metal derivatives of the nitrogen bases, and can thus be represented by the formula:

(IX)

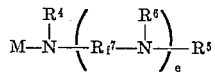

wherein M, $R^4$, $R^5$, $R^6$, $R^7$, $e$ and $f$ are as previously defined.

These amides may be prepared by reacting an alkali metal with a nitrogen base. When this technique is employed, it is preferred that the nitrogen base have a boiling point in excess of the melting point of the alkali metal, thus permitting the reaction to occur with liquid, and therefore more readily dispersed and more reactive, metal under atmospheric pressure. Alternatively, or in addition, it is desirable to effect the reaction of alkali metal with amine in the presence of a complexing agent for the alkali metal, for example a conjugated diene such as 1,3-butadiene.

The ratio of nitrogen base to alkali metal amide is not narrowly critical, and can vary from about 1:1 or less to 50:1 or higher. Ratios of from about 2:1 to about 10:1 are preferred.

The ratio of alkali metal to alkenylbicycloheptene is not narrowly critical, and can vary from as low as 0.01 gram atom of alkali metal per mole of alkenylbicycloheptene or lower to as high as 10 gram atoms of alkali metal per mole of alkenylbicycloheptene or even higher. The optimum ratios will vary somewhat for each catalyst system, but generally are from about 0.01:1 to about 2:1, preferably 0.45:1 to 0.5:1, for the high-surface alkali metal system; from about 0.1:1 to about 5:1, preferably from 0.5:1 to 1:1, for the strong-base/dipolar aprotic cationic solvating agent system; and from about 0.01:1 to about 1:1, preferably 0.05:1 to 0.5:1 for the alkali metal amide/nitrogen base system.

The reaction temperature is not narrowly critical, and the process is readily effected at temperatures of from about 0° C. or lower to about 200° C. or higher, although the optimum temperature is in the range of from about 75° C. to about 150° C. Pressure is not critical, provided the reaction is effected in the liquid phase.

Although not necessary, the process of this invention can be conducted in the presence of inert organic solvents and diluents, such as saturated and aromatic hydrocarbons or their chlorinated derivatives, including pentane, hexane, heptane, octane, cyclopentane, cyclohexane, methylcyclohexane, benzene, toluene, xylene, methylenechloride, carbontetrachloride, chlorobenzene, dichlorobenzene, and the like.

The products of the process of this invention are readily recovered by conventional techniques.

The follownig examples are illustrative.

EXAMPLES 1–5.—THE HIGH-SURFACE ALKALI METAL SYSTEM

*Example 1*

To a nitrogen-purged flask was charged 140 grams of alumina which had been dried for 60 hours at 400° C. After cooling the alumina to 165° C., 14 grams of sodium were added over a period of 25 minutes. The resulting mixture was cooled to room temperature and was found to weigh 154 grams.

*Example 2*

A 500-milliliter reaction flask was charged with 67 grams (0.558 mole) of 5-vinylbicyclo[2.2.1]hept-2-ene and 15 grams (0.0593 gram atom Na) of the high-surface sodium produced in Example 1. An exothermic reaction occurred, raising the temperature to 40° C. The reaction mixture was maintained without heating for 16.75 hours, during which time periodic analyses were conducted by vapor phase chromatography.

| Time, hours | Analysis, Percent | |
|---|---|---|
| | VBCH* | EBCH* |
| 1.0 | 59.6 | 40.4 |
| 5.5 | 17.5 | 82.5 |
| 16.75 | 2.5 | 97.5 |

*VBCH=5-Vinylbicyclo[2.2.1]hept-2-ene. EBCH=5-Ethylidenebicyclo[2.2.1]hept-2-ene.

*Example 3*

To 60 grams (0.5 mole) of 5-vinylbicyclo[2.2.1]hept-2-ene heated at 82° C. was added 5 grams (0.01975 gram atom Na) of the high-surface sodium produced in Example 1. An exothermic reaction occurred, causing a temperature rise to 90° C. After one hour from the addition of catalyst 16 percent of the vinylbicycloheptene had isomerized to ethylidenebicycloheptene. After the addition of an additional 5 grams (0.01975 gram atom Na) of high-surface sodium, the reaction proceeded as follows:

| Time, hours | Analysis, Percent | |
|---|---|---|
| | VBCH | EBCH |
| 0.1 | 30.5 | 69.5 |
| 1.6 | 3.5 | 96.5 |
| 2.1 | 1.5 | 98.5 |

*Example 4*

To demonstrate the effect of purity of the 5-vinylbicyclo[2.2.1]hept-2-ene on the reaction rate when high-surface sodium is the catalyst, two runs were conducted under essentially the same conditions except that the vinylbicycloheptene employed in one run was purified by redistillation over sodium and the vinylbicycloheptene employed in the second run was purified by passing it over alumina.

(A) *Purification by alumina.*—To 60 grams (0.5 mole) of vinylbicycloheptene heated at 70° C. was added 10 grams (0.0395 gram atom Na) of high-surface sodium produced in the manner described in Example 1. After 1 hour, at which time 54.2 percent of the vinylbicycloheptene charged had isomerized to ethylidenebicycloheptene, an additional 5 grams (0.0195 gram atom Na) of high-surface sodium was added. After 2.87 hours from the addition of the second portion of catalyst the product contained over 99 perecnt ethylidenebicycloheptene.

(B) *Purification by distillation.*—To 60 grams (0.5 mole) of vinylbicycloheptene heated at 68° C. was added 10 grams (0.079 gram atom Na) of high-surface sodium, causing an exotherm to 75° C. in 2 minutes. After 50 minutes only 19.8 percent of the vinylbicycloheptene had isomerized. After the addition of 5 grams (0.0395 gram atom Na) of the catalyst and continued heating at 70° C. for an additional 1.75 hours only 68.7 percent isomerization had occurred. Another 5-gram (0.0395 gram atom Na) portion of the catalyst was added and, after 2 hours, 94.2% conversion was observed. After stirring overnight at 80° C., the product was 97.8 percent ethylidenebicycloheptene and 2.2 percent vinylbicycloheptene.

*Example 5*

A mixture of 62 grams (0.517 mole) of 5-vinylbicyclo[2.2.1]hept-2-ene and 15 grams of alumina was heated to 113° C., and 1.5 grams (0.0652 gram atom) of sodium was added over six minutes. After 0.5 hour at 110° C. no isomerization had occurred, as determined by vapor phase chromatography. The mixture was maintained at 57–65° C. for an additional 6 hours without evidence of isomerization.

EXAMPLES 6–20.—THE STRONG-BASE/DIPOLAR APROTIC CATIONIC SOLVATING AGENT SYSTEM

*Example 6*

A charge of 30 grams (0.25 mole) of 5-vinylbicyclo[2.2.1]hept-2-ene, 27.2 grams (0.243 mole) of potassium tert-butoxide and 126 milliliters (1.78 moles) of dry dimethylsulfoxide was heated at 50° C. for one week. The resulting reaction mixture was admixed with 250 milliliters of water, and the organic and aqueous layers were separated. The organic layer was extracted with four 40-milliliter portions of n-hexane. The hexane extracts were combined and the hexane was distilled off, leaving 25 grams of crude 5-ethylidenebicyclo[2.2.1]hept-2-ene product. To the crude product was added 15 grams of diethylbenzene, and the resulting mixture was distilled at reduced pressure. Six grams of 5-ethylidenebicyclo[2.2.1]heptene was recovered as a distillate boiling at 62° C. and 50 millimeters Hg. An additional 12 grams was recovered from the distillation cold trap, thus providing a total recovery of 18 grams (60 percent yield). The structure was confirmed by infrared spectroscopy, nuclear magnetic resonance spectroscopy and elemental analysis. Calculated for $C_9H_{12}$: C, 89.94; H, 10.06. Found: C, 89.71; H, 10.11.

*Example 7*

A charge of 453 grams (3.78 moles) of 5-vinylbicyclo[2.2.1]hept-2-ene, 408 grams (3.64 moles) of potassium tert-butoxide and 1900 milliliters (26.7 moles) of dry dimethylsulfoxide was heated with stirring at 50° C. for 120 hours. The reaction mixture was admixed with about 4,000 milliliters of water and the aqueous and organic layers separated. The organic layer, which weighed 406 grams, was extracted three times with 300 milliliters of n-hexane. After distillation at atmospheric pressure and 67° C. to remove the hexane, the crude product, which weighed 470 grams, was vacuum distilled at 80–100 millimeters Hg absolute, and 5-ethylidenebicyclo[2.2.1]hept-2-ene was recovered in an amount of 400 grams at 81° C./89 mm. Hg–78.5° C./80 mm. Hg. The structure of the product was confirmed by refractive index, infrared spectroscopy, and nuclear magnetic resonance spectroscopy.

*Example 8*

A mixture of 2.4 grams (0.0364 mole) of 85 percent potassium hydroxide pellets and 25 milliliters (0.351 mole) of dimethylsulfoxide was heated at 113° C. and 5 grams (0.046 mole) of 5-vinylbicyclo[2.2.1]hept-2-ene was added. Periodically samples of the reaction mixture were taken and analyzed by vapor phase chromatography. The results of these analyses are summarized as follows:

| Time, Hr. | Analysis, percent | | Efficiency, percent* |
|---|---|---|---|
| | VBCH | EBCH | |
| 2.6 | 22.8 | 77.2 | 100 |
| 4.6 | 16.5 | 83.5 | 100 |
| 9.2 | 8.0 | 92.0 | 100 |

* Efficiency=weight of EBCH + VBCH in product/weight of VBCH charged.

*Example 9*

A mixture of 12 grams (0.1 mole) of 5-vinylbicyclo[2.2.1]hept-2-ene, 11.2 grams (0.1 mole) of potassium tert-butoxide and 75 milliliters (0.78 mole) of N-methylpyrrolidone was heated at 75–85° C. and the course of the reaction was followed by vapor phase chromatography as in Example 8. The results are as follows:

| Time, Hr. | Analysis, percent | | Efficiency, percent |
|---|---|---|---|
| | VBCH | EBCH | |
| 21 | 14.3 | 85.7 | 100 |
| 45 | <2 | >98.0 | 100 |

*Example 10*

A charge of 25 grams (0.208 mole) of 5-vinylbicyclo[2.2.1]hept-2-ene, 11.2 grams (0.1 mole) of potassium tert-butoxide and 75 milliliters (0.81 mole) of N,N-dimethylacetamide was heated at 80–98° C. and the reaction was followed by vapor phase chromatography.

| Time, Hr. | Analysis, percent | | Efficiency, percent |
|---|---|---|---|
| | VBCH | EBCH | |
| 65 | 34.3 | 65.6 | |
| 113 | 23.7 | 76.3 | >90 |

Example 11

A mixture of 5 grams (0.0416 mole) of 5-vinylbicyclo[2.2.1]hept-2-ene, 4 grams (0.0357 mole) of potassium tert-butoxide and 50 milliliters of hexamethylphosphoramide was held at room temperature for 8 days. At the end of this period, the yield of 5-ethylidenebicyclo[2.2.1]hept-2-ene was 56 percent, as determined by vapor phase chromatography.

Example 12

A mixture of 10 grams (0.0833 mole) of 5-vinylbicyclo[2.2.1]hept-2-ene, 9 grams (0.0803 mole) of potassium tert-butoxide, 35 milliliters (0.492 mole) of dimethylsulfoxide and 25 milliliters (0.26 mole) of tert-butanol was heated at 98–108° C. and the course of the reaction was followed by vapor phase chromatography.

| Time, Hr. | Analysis, percent | | Efficiency, percent |
|---|---|---|---|
| | VBCH | EBCH | |
| 20 | 35.1 | 64.9 | |
| 31.4 | 21.6 | 78.4 | |
| 56.4 | 1.3 | 98.7 | |
| 92.6 | <1.0 | >99.0 | 90 |

Example 13

A charge of 11 grams (0.0458 mole) of sodium sulfide hydrate ($Na_2S \cdot 9H_2O$) and 25 milliliters of dimethylsulfoxide was heated to 122° C. and 12 grams (0.1 mole) of 5-vinylbicyclo[2.2.1]hept-2-ene was added and the heating at 122° C. was continued overnight. No isomerization occurred, as determined by vapor phase chromatography.

Example 14

A mixture of 12 grams (0.1 mole) of 5-vinylbicyclo[2.2.1]hept-2-ene, 14 grams 0.4 mole) of ammonium hydroxide and 50 milliliters (0.703 mole) of dimethylsulfoxide was stirred at room temperature for 24 hours. No isomerization was observed.

Example 15

A mixture of 7.5 grams (0.101 mole) of calcium hydroxide and 50 milliliters (0.703 mole) of dimethylsulfoxide was heated to 106° C. and 12 grams (0.1 mole) of 5-vinylbicyclo[2.2.1]hept-2-ene was added. No isomerization was observed after heating the resulting mixture at 100–110° C. for 20. hours.

Example 16

A mixture of 5 grams (0.0416 mole) of 5-vinylbicyclo[2.2.1]hept-2-ene, 5.5 grams (0.0398 mole) of potassium carbonate and 25 milliliters (0.351 mole) of dimethylsulfoxide was heated at 100–117° C. for 20.25 hours without isomerization occurring.

Example 17

A mixture of 15 grams (0.125 mole) of 5-vinylbicyclo[2.2.1]hept-2-ene, 7 grams (0.0625 mole) of potassuim tert-butoxide and 100 milliliters (1.05 mole) of tert-butanol was refluxed (83° C.) for 24 hours without isomerization occurring.

Example 18

A mixture of 10 grams (0.0833 mole) of 5-vinylbicyclo[2.2.1]hept-2-ene, 5 grams (0.0926 mole) of sodium methoxide and 100 milliliters (2.48 moles) of methanol was refluxed (65° C.) for 24 hours without isomerization. Then 10 milliliters (0.14 mole) of dimethylsulfoxide was added and the resulting mixture was refluxed or an additional 2 hours without isomerization.

Example 19

To a mixture of 27 grams (0.46 mole) of acetone and 3 grams (0.027 mole) of potassium tert-butoxide heated at 42° C. was added 14 grams (0.117 mole) of vinylbicycloheptene. The resulting mixture was heated at 62° C. for 20 hours without evidence of isomerization.

Example 20

To a mixture of 35 grams (0.854 mole) of acetonitrile and 3 grams (0.027 mole) of potassium tert-butoxide heated at 32° C. was added 15 grams (0.127 mole) of vinylbicycloheptene. The resulting mixture was heated at 82° C. for 20 hours without evidence of isomerization.

EXAMPLES 21–36.—THE ALKALI METAL AMIDE/NITROGEN BASE SYSTEM

Example 21

A mixture of 100 grams (1.67 moles) of ethylenediamine and 4 grams (0.174 gram atom) of sodium was heated at reflux (114° C.) for 1 hour, during which time the color of the reaction mixture changed from blue to yellow to red-brown, indicating the formation of an N-sodio amine species. To the refluxing mixture were added 100 grams (0.833 mole) of 5-vinylbicyclo[2.2.1]hept-2-ene, which, after 45 minutes, had completely isomerized to 5-ethylidenebicyclo[2.2.1]hept-2-ene, as determined by vapor phase chromatography. A second 100-gram (0.833 mole) portion of vinylbicycloheptene was added and was completely isomerized in 15 minutes. On standing, the reaction mixture separated into two layers. The upper ethylidenebicycloheptene, layer was removed and an additional 200 grams of vinylbicycloheptene was added to the lower layer at 110° C. After 2 hours, 95 percent of the vinylbicycloheptene had isomerized to ethylidenebicycloheptene.

Example 22

A mixture of 33 grams (0.22 mole) of diethylenetriamine and 1 gram (0.0435 gram atom) of sodium was heated at 170° C. for 1 to 1.5 hours, at which time the reaction mixture had become black. To this mixture was added 35 grams (0.292 mole) of 5-vinylbicyclo[2.2.1]hept-2-ene which was completely isomerized to 5-ethylidenebicyclo[2.2.1]hept-2-ene in 1.22 hours.

Example 23

A mixture of 1415 grams (11.8 moles) of 5-vinylbicyclo[2.2.1]hept-2-ene, 170 grams (1.65 moles) of diethylenetriamine and 4 grams (0.174 gram atom) of soduim was heated to 114° C. without isomerization of the vinylbicycloheptene. Over the next 4.5 hours 13.5 grams (0.35 mole) of sodamide suspended in mineral oil was added in small portions. At the completion of the addition, 95.8 percent conversion of vinylbycycloheptene to ethylidenebicycloheptene was observed by vapor phase chromatography. After the addition of 250 milliliters of methanol to react with the sodium, the resulting product was distilled at atmospheric pressure to recover 1332 grams of 5-ethylidenebicyclo[2.2.1]hept-2-ene boiling at 150–151° C., representing a 94.3 percent yield.

Example 24

A mixture of 60 grams (0.5 mole) of 5-vinylbicyclo[2.2.1]hept-2-ene and 0.5 gram (0.0218 gram atom) of sodium was heated to 95° C. and 2.1 grams (0.054 mole) of sodamide was added in three portions over 3 hours. The reaction mixture was maintained at 95° C. overnight without the occurrence of isomerization as determined by vapor phase chromatography.

Example 25

A mixture of 30 grams (0.338 mole) of N-methylbutylamine and 1 gram (0.435 gram atom) of sodium was heated at reflux (91° C.) for about 4 hours, without significant reaction of the metallic sodium. Thereafter 10 grams (0.078 mole) of di-n-butylamine was added to increase the boiling point of the mixture above the melting point of sodium. When the temperature reached 100°

C., 1 to 2 grams of sodium amide was added and the heating was continued for 50 minutes. At this time 10 grams of 5-vinylbicyclo[2.2.1]hept-2-ene was added and found to be completely isomerized after 1 hour and 25 minutes.

*Example 26*

A mixture of 30 grams (0.232 mole) of 2-ethylhexylamine and 2 grams (0.087 gram atom) of sodium was heated at 140° C. for 1.0 hour and 18 grams (0.125 mole) of vinylbicycloheptene was added. After heating at 112–140° C. for 3.1 hours the product mixture analyzed 23.6 percent ethylidenebicycloheptene and, after 5.5 hours, analyzed 47.2 percent ethylidenebicycloheptene.

The experiment was repeated, except that the ethylhexylamine/sodium mixture was heated at 110° C. for 1 hour while bubbling 1,3-butadiene through the mixture at a rate of 30 cubic centimeters per minute prior to the addition of 17 grams of vinylbicycloheptene. After 1.9 hours at 110–138° C. the product contained 83.6 percent ethylidenebicycloheptene and 16.4 percent vinylbicycloheptene.

*Example 27*

A mixture of 25 grams (0.42 mole) of ethylenediamine and 2.5 grams (0.022 mole) of potassium t-butoxide was heated to 108° C. and 20 grams of vinylbicycloheptene was added. At the end of 4.2 hours at 113° C. the vinylbicycloheptene was 26 percent isomerized.

*Example 28*

A mixture of 100 grams of 5-vinylbicycloheptene, 20 grams of ammonia and 3 grams of sodium amide was added to a 1 liter autoclave and heated at 120–126° C. for 1.5 hours. The pressure developed in the autoclave was 525 p.s.i.g. At the end of this time vapor phase chromatograph analysis showed a 70% conversion to 5-ethylidenebicycloheptene.

*Example 29*

A mixture of 100 grams of 5-vinylbicycloheptene, 60 grams of ammonia and 5 grams of sodium was added to a 1 liter rocker autoclave and heated to 140° C. over a 50 minute period. A sample at this time revealed that 76% of the starting material had isomerized to 5-ethylidenebicycloheptene. After 1 hour at 140° C., 91% had isomerized and after 2 hours at 140° C., 96% had isomerized to 5-ethylidenebicycloheptene. The maximum pressure developed during the reaction was 910 p.s.i.g.

*Example 30*

An experiment was carried out similar to that disclosed in Example 29 but with a substitution of 5 grams of sodium for the 5 grams of sodium amide. After heating to 140° C., 74% of the 5-vinylbicycloheptene had isomerized to 5-ethylidenebicycloheptene. After two hours at 140° C. isomerization had proceeded to the extent of 97%.

*Example 31*

A mixture of 100 milliliters of pyridine and 2 grams of sodium was heated to 98° C., and within 15 minutes a blue-black solution resulted. At this point 54 grams of 5-vinylbicycloheptene was added and the temperature was maintained at 98–115° C. for 3.5 hours. Analysis showed that isomerization had proceeded to the extent of 11.9% of 5-ethylidenebicycloheptene.

*Example 32*

A mixture of 100 milliliters of methylethylpyridine and 2 grams of sodium was heated to 107° C. and then 30 grams of 5-vinylbicycloheptene was added. The reaction mixture was maintained at 90–107° C. for 6.5 hours. Analysis indicated that isomerization to 5-ethylidenebicycloheptene had proceeded to the extent of 36.4%.

*Example 33*

A mixture of 100 milliliters of methylethylpyridine and 30 grams of 5-vinylbicycloheptene was heated to 110° C. and 5 grams of sodium amide was added over a six minute period. After heating at 110–118° C. for 5.5 hours, the 5-vinylbicycloheptene was isomerized to the extent of 58.5% to 5-ethylidenebicycloheptene.

*Example 34*

A mixture of 20 grams of ethylenediamine and 100 grams of 5-vinylbicycloheptene was heated to 120° C. and 3 grams of sodium amide was cautiously added in small portions. The reaction was continued for one hour at 120° C., cooled and poured over crushed ice. Water was added and the phases separated. The oil phase was water washed and weighed 60 grams. The vapor phase chromatograph analysis showed that it was 5-ethylidenebicycloheptene.

*Example 35*

A mixture of 40 grams of diethylenetriamine and 200 grams of 5-vinylbicycloheptene was heated to 120° C. and 6 grams of sodium amide was cautiously added in small portions. The reaction mixture was refluxed at 120° C. for one hour and then was distilled at 125 milliliter pressure. There was obtained 184 grams of a cut which contained 97% 5-ethylidenebicycloheptene, 1.5% 5-vinylbicycloheptene and 1.5% of the diethylenetriamine.

*Example 36*

A mixture of 50 grams of ethylenediamine was charged to a reaction flask and heated to 100° C. A total of 3 grams of lithium was added in small portions and stirred until all of the lithium had reacted with the ethylenediamine; a yellow solution was formed. Then 100 grams of 5-vinylbicycloheptene was added in a drop-wise manner and the solution was heated at a reflux temperature of 117° C. for 45 minutes. After cooling the solution was poured over ice; water and hexane were added and the two phases were separated. The organic phase was water-washed, stripped of hexane and was found to consist of 80 grams of 98%, 5-ethylidenebicycloheptene.

EXAMPLES 37–38.—ACID CATALYSTS

*Example 37*

A mixture of 50 grams (0.417 mole) of 5-vinylbicyclo[2.2.1]hept-2-ene, 10 grams (0.058 mole) of p-toluenesulfonic acid and 50 milliliters of hexane was heated at 85° C. for 6 hours. No isomerization occurred.

*Example 38*

A mixture of 62 grams (0.517 mole) of 5-vinylbicyclo[2.2.1]hept-2-ene and 10 grams of Amberlyst-15 carbon exchange resin was heated at 85–95° C. for 3 hours without evidence of isomerization. Addition of an additional 8 grams of resin and heating for another 6 hours failed to produce ethylidenebicycloheptene.

What is claimed is:
1. The process for producing 5-alkylidenebicyclo[2.2.1]hept-2-ene comprising isomerizing 5-alkenylbicyclo[2.2.1]hept-2-ene in contact with a base catalyst selected from the group consisting of
(a) an alkali metal deposited on a support having a surface area of at least about 30 square meters per gram;
(b) an admixture of
(1) a strong base of an alkali metal, and
(2) a dipolar aprotic solvating agent which is liquid at the process conditions; and
(c) an admixture of
(1) an alkali metal amide, and
(2) a nitrogen base containing at least one hydrogen bonded to nitrogen and which is liquid at the process conditions.

2. The process as claimed in claim 1 wherein said 5-alkenylbicyclo[2.2.1]hept-2-ene is 5-vinylbicyclo[2.2.1]hept-2-ene and recovering the 5-alkylidenebicyclo[2.2.1]hept-2-ene.

3. The process as claimed in claim 2 wherein said base catalyst is an alkali metal deposited on alumina.

4. The process as claimed in claim 3 wherein said alkali metal is sodium.

5. The process as claimed in claim 4 wherein said 5-vinylbicyclo[2.2.1]hept-2-ene has been purified by treatment with alumina.

6. The process as claimed in claim 2 wherein
(a) said strong base is represented by the formula MZ, wherein M is an alkali metal having an atomic number of from 3 to 19, inclusive, and Z is a number selected from the group consisting of amino, hydroxyl and hydrocarbyloxy free from nonbenzenoid unsaturation and containing from 1 to 10 carbons, and
(b) said dipolar, aprotic solvating agent is represented by the formula

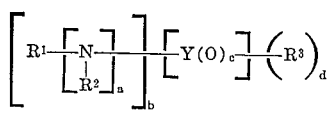

wherein Y is carbon, phosphorus or sulfur; $a$ is an integer having a value of from 0 to 1, and is 1 only when Y is carbon or phosphorus; $b$ is an integer having a value of 1 or 3, and is 1 only when Y is carbon or sulfur and is 3 only when Y is phosphorus; $c$ is an integer having a value of 1; $d$ is an integer having a value of from 0 to 1, and is 0 only when Y is phosphorus and is 1 only when Y is carbon or sulfur; each $R^1$ and $R^2$, when taken alone, is a hydrocarbyl radical free from nonbenzenoid unsaturation containing up to about 10 carbons; $R^3$, when taken alone, is hydrogen or a hydrocarbyl radical free from nonbenzenoid unsaturation containing up to about 10 carbons, and is hydrocarbyl when Y is sulfur; $R^1$ and $R^2$, when taken together, form an alkanediyl radical of from about 2 to about 10 carbons which, when taken with >N—, forms a heterocyclic ring of from 3 to 6 ring members; and $R^1$ and $R^3$, when Y is carbon or sulfur and when taken together, form an alkanediyl radical of from about 3 to 10 carbons which, when taken with

forms a heterocyclic ring of from 5 to 6 ring members.

7. The process as claimed in claim 6 wherein M is potassium.

8. The process as claimed in claim 7 wherein said solvating agent is dimethylsulfoxide.

9. The process as claimed in claim 2 wherein
(a) said alkali metal amide is a derivative of said nitrogen base obtained by the substitution of a hydrogen bonded to nitrogen by an alkali metal, and
(b) said nitrogen base is represented by the formula:

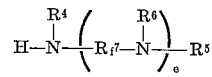

wherein each $R^4$, $R^5$ and $R^6$, when taken separately, is hydrogen or hydrocarbyl free from non-benzenoid unsaturation of up to about 20 carbons; $R^7$ is a divalent hydrocarbyl radical free from nonbenzenoid unsaturation and containing from 2 to about 10 carbons; $e$ is an integer having a value of from 0 to about 10; and $f$ is an integer having a value of from 0 to 1, and is 1 when $e$ has a value of greater than 1.

10. The process as claimed in claim 9 wherein said alkali metal is sodium.

11. The process as claimed in claim 10 wherein said nitrogen base is a member selected from the group consisting of ethylene diamine and diethylene triamine.

12. The process as claimed in claim 11 wherein said reaction mixture also contains sodamide.

13. The process as claimed in claim 9 wherein said alkali metal is lithium.

14. The process as claimed in claim 9 wherein said nitrogen base is ammonia.

References Cited

UNITED STATES PATENTS

| | | | |
|---|---|---|---|
| 3,009,001 | 11/1961 | Crain | 260—666 |
| 3,016,409 | 1/1962 | Vesely | 260—666 |
| 3,076,855 | 2/1963 | Crain | 260—666 |
| 3,124,621 | 3/1964 | Crain | 260—666 |
| 3,151,173 | 9/1964 | Nyce | 260—666 |
| 3,213,155 | 10/1965 | Schriesheim | 260—680 |
| 3,217,050 | 11/1965 | Schriesheim | 260—680 |
| 3,251,894 | 5/1966 | Amagasa et al. | 260—666 |

OTHER REFERENCES

Schriesheim et al.: J. Amer. Chem. Soc. 84, 3160–4, Aug. 20, 1962.

Schriesheim et al.: J. Amer. Chem. Soc. 84, 3164–8, Aug. 20, 1962.

Herling et al.: J. Amer. Chem. Soc. 87, 4107–4110, Sept. 20, 1965.

DELBERT E. GANTZ, *Primary Examiner.*

V. O'KEEFE, *Assistant Examiner.*

UNITED STATES PATENT OFFICE
CERTIFICATE OF CORRECTION

Patent No. 3,347,944                      October 17, 1967

Henry E. Fritz et al.

It is hereby certified that error appears in the above numbered patent requiring correction and that the said Letters Patent should read as corrected below.

Column 1, line 15, for "5-alkyldienebicyclo[2.2.1]" read -- 5-alkylidenebicyclo[2.2.1] --; column 13, lines 3 and 4, strike out "and recovering the 5-alkylidenebicyclo-[2.2.1]hept-2-ene" and insert the same after "conditions" in column 12, line 75.

Signed and sealed this 22nd day of October 1968.

(SEAL)
Attest:

Edward M. Fletcher, Jr.                    EDWARD J. BRENNER

Attesting Officer                           Commissioner of Patents